United States Patent [19]
Fleischer et al.

[11] 3,794,927
[45] Feb. 26, 1974

[54] SYSTEM FOR PRODUCING HIGH ENERGY POSITIVELY CHARGED PARTICLES

[75] Inventors: Allan A. Fleischer, Lafayette; George O. Hendry, Napa; Dale K. Wells, Martinez, all of Calif.

[73] Assignee: The United States of America as represented by the United States Atomic Energy Commission, Washington, D.C.

[22] Filed: Jan. 20, 1970

[21] Appl. No.: 4,223

[52] U.S. Cl.................... 328/233, 313/62, 328/234
[51] Int. Cl. ............................................. H05h 5/06
[58] Field of Search ............... 313/62; 328/234, 233

[56] References Cited
UNITED STATES PATENTS
2,789,221   4/1957   Tobias............................ 313/62 X

Primary Examiner—Raymond F. Hossfeld
Attorney, Agent, or Firm—John A. Horan; Randall G. Erdley

[57] ABSTRACT

A system for producing high energy positively charged particles which includes in series a source of negative ions; means axially injecting these ions into a small cyclotron which accelerates the ions to a first energy level; means extracting negative ions from the cyclotron in a high quality beam; and a two-stage tandem Van de Graaff accelerator which accepts the beam of negative ions at the first energy level, then accelerates them to a second higher energy level, strips their negative charge, and finally accelerates the resulting positive particles to a still higher third energy level.

15 Claims, 22 Drawing Figures

FIG_2

FIG_1

INVENTORS
ALAN A. FLEISCHER
GEORGE O. HENDRY
DALE KENNETH WELLS

Eckhoff & Hoppe
ATTORNEYS

FIG_3

FIG_16

FIG_17

FIG_18

FIG_22

FIG_19

FIG_20

SYSTEM FOR PRODUCING HIGH ENERGY POSITIVELY CHARGED PARTICLES

This invention refers generally to methods and means for producing high energy positively charged particles and more particularly to a method and means whereby negative ions are injected into and then circularly accelerated to a first energy level in the order of 15 MeV by a cyclotron, a high quality beam of negative ions is extracted from the cyclotron and then further accelerated linearly to a second energy level, stripped of negative charges and finally accelerated linearly to a third still higher energy level to provide protons at about 30 MeV energy. This generalized combination of cyclotron and Van de Graaff accelerator has been suggested but never developed or realized before this invention [See "The Acceleration and Extraction of Negative Hydrogen Ions in the C. U. Cyclotron" by M. E. Rickey and Rodman Smythe in *Nuclear Instruments and Methods*, vol. 18, 19 (1962) pages 66 – 69 and "Cyclo-Graaff" by A. A. Fleischer and H. W. Newson in *Bulletin of the American Physical Society* (1966) Series II, vol. 11, No. 3, page 392.]

One object of this invention is to provide high energy positively charged particles in the order of 30 MeV at a considerably reduced cost by combining the acceleration capabilities of a Van de Graaff accelerator and of a cyclotron.

Another object of this invention is to provide a specific method and means for generating energetic negative ions in a high quality beam which is acceptable for further acceleration in an electrostatic linear accelerator in order to approximately double the proton energy of the linear accelerator.

Other objects and advantages of the invention will become apparent from a consideration of the following description and the accompanying drawings wherein.

Figure 1:
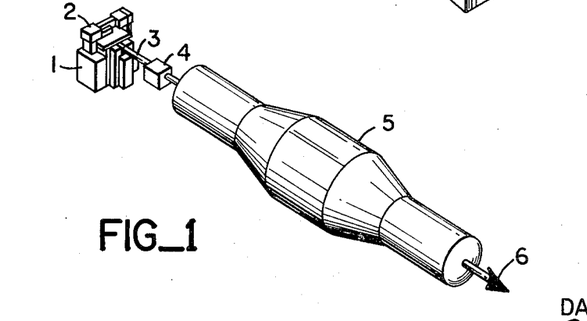
FIG. 1 is a schematic perspective view of a cyclotron and a series connected tandem Van de Graaff accelerator.

FIG. 1 illustrates specific apparatus useful in this system. It includes a small cyclotron, referred to generally as 1, which defines an evacuated acceleration region within its magnetic guide field. An external ion source 2 produces a plurality of low energy ions outside of the cyclotron guide field, separates a stream of negative ions (negative hydrogen ions, for example) and then axially migrates them axially in parallelism with the cyclotron guide field to the median plane at the cyclotron central region. The r-f acceleration field developed by the cyclotron dees in combination with the guide field accelerates the negative ions in circular orbits of increasing radius from the central region outwardly to an extraction radius. Orbiting negative ions at the extraction radius are then extracted from orbit in a high quality beam which emerges from the cyclotron at a first energy level.

This beam conducted through an evacuated transmission system 3, which may include beam quality improvement means 4, supplies tandem Van de Graaff accelerator 5 which may be, for example, a model FN two-stage machine manufactured and sold by High Voltage Engineering Corporation of Burlington, Mass. In this accelerator the negative ions are linearly accelerated to a second higher energy level in a first stage, then by a foil stripper stripped of their negative charge to produce positive particles (protons for example), and in a second stage the protons are accelerated to a still higher third energy level and emitted as a useful beam as at 6.

Figure 2:
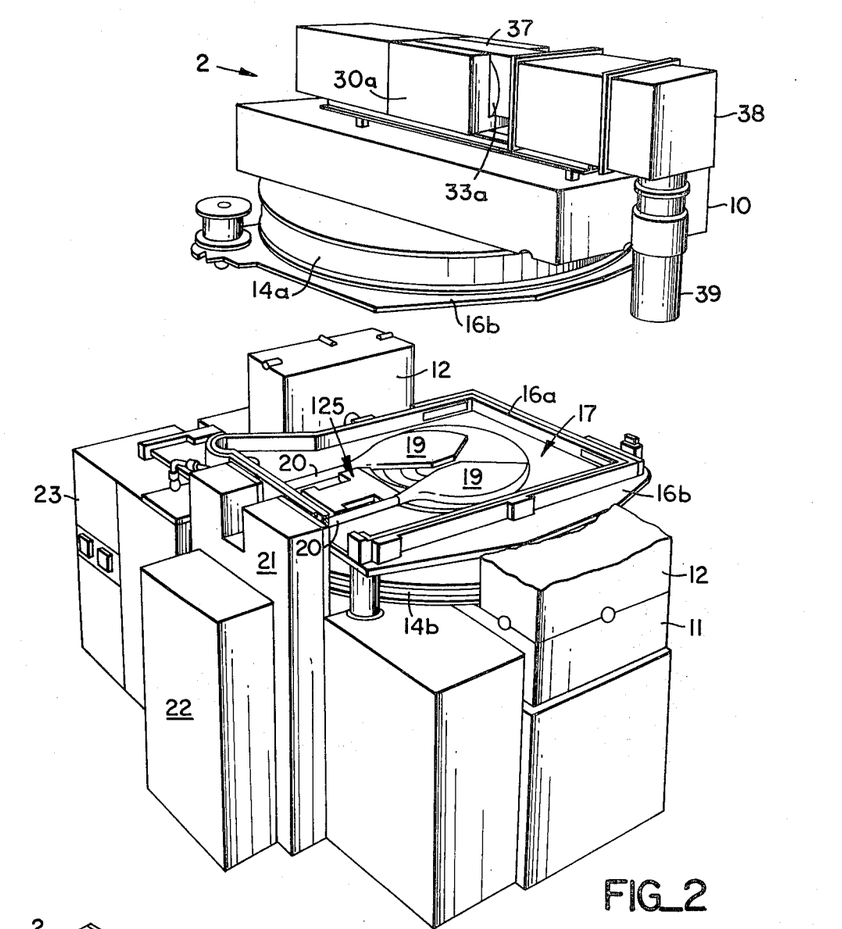
FIG. 2 is an exploded perspective view of one model of cyclotron employed in the system.

The cyclotron 1 employed for the initial acceleration is a small diameter, azimuthally varying field, isochronous cyclotron illustrated in FIG. 2 with the top part of the guide field magnet raised for clarity of illustration. Its guide field electromagnet includes upper iron yoke slab 10, lower iron yoke slab 11, two interconnecting return iron legs 12 and two cylindrical iron pole bases 13, one on the upper and lower yoke slabs, respectively. One pole base is shown on FIG. 18 and both, in section on FIG. 3. These iron components are doweled and assembled into a unitary magnet core.

An upper water-cooled d-c magnet coil 14a embraces the upper pole base and a lower coil 14b embraces the lower pole base 13 within the return iron legs 12. The pole tips are iron plates 15a, 15b bolted to the pole bases that, with non-magnet side walls 16a and vacuum plates 16b form vacuum tank 17 within which particles are accelerated in the machine.

Figure 18:
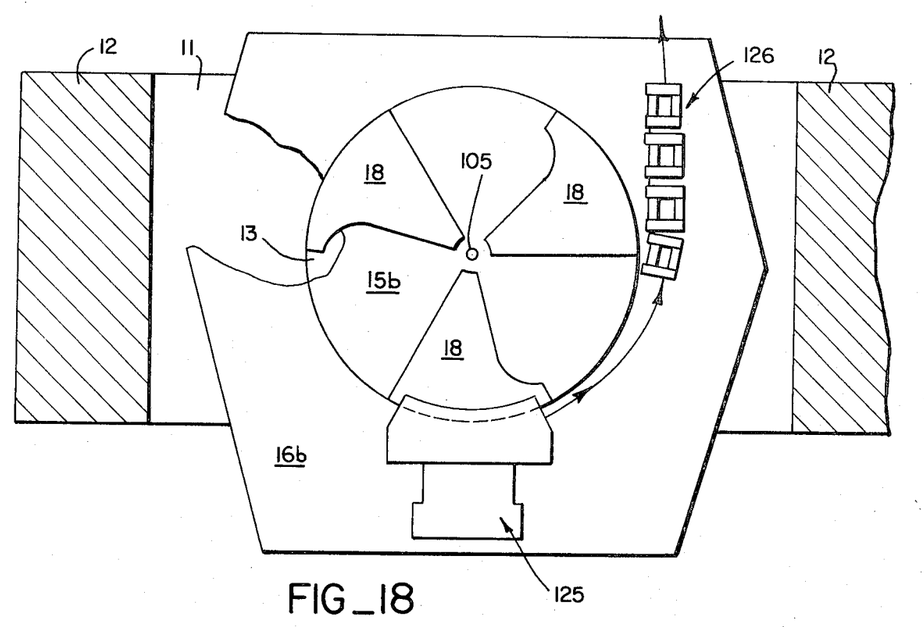
FIG. 18 is a plan view at the median plane of the cyclotron with top portions of the machine broken away.
Figures 19, 20:
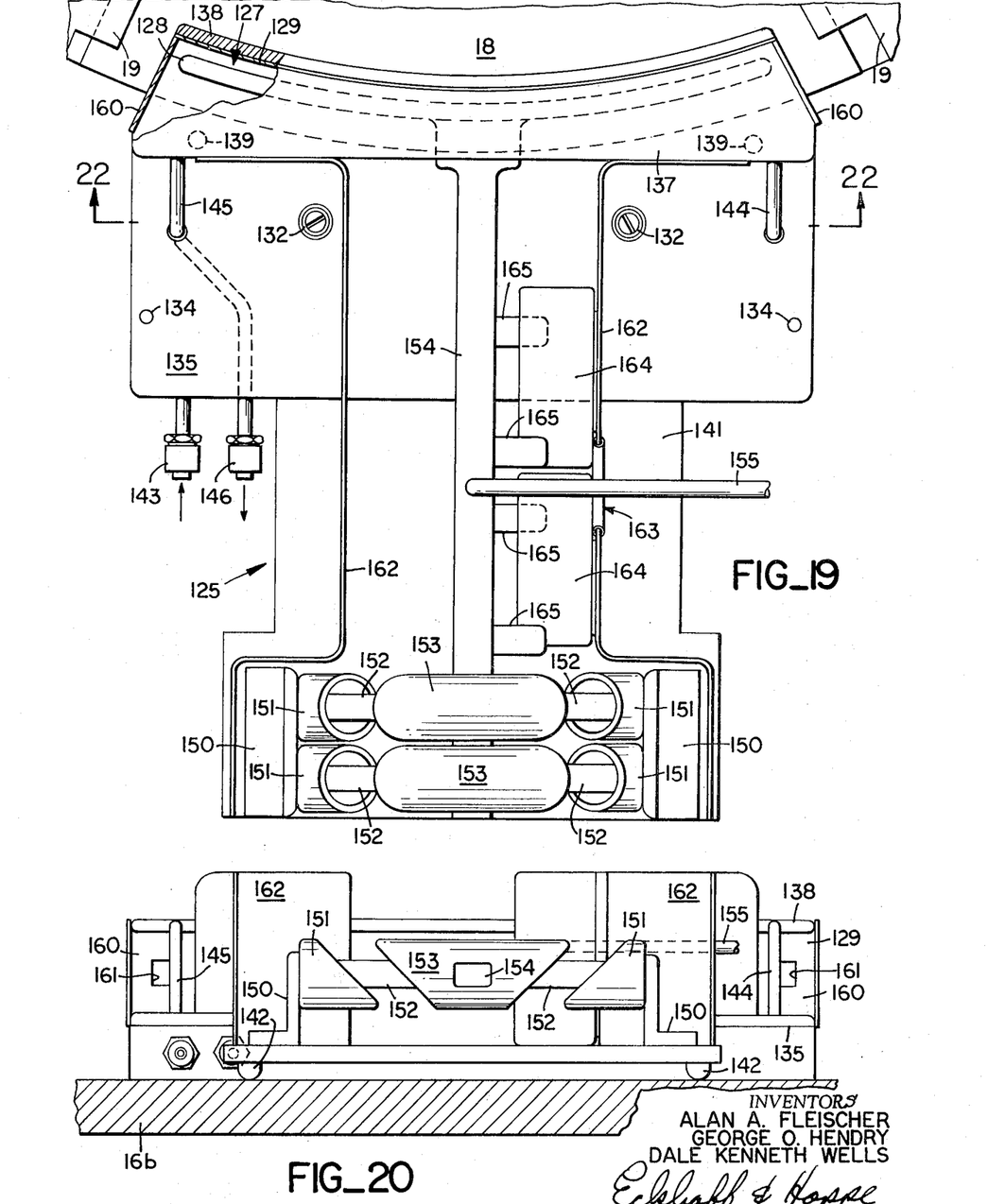
FIG. 19 is a top view of the electrostatic deflection means of the cyclotron extraction system.
FIG. 20 is an end elevational view of the electrostatic deflection means of FIG. 19.
Figure 21:
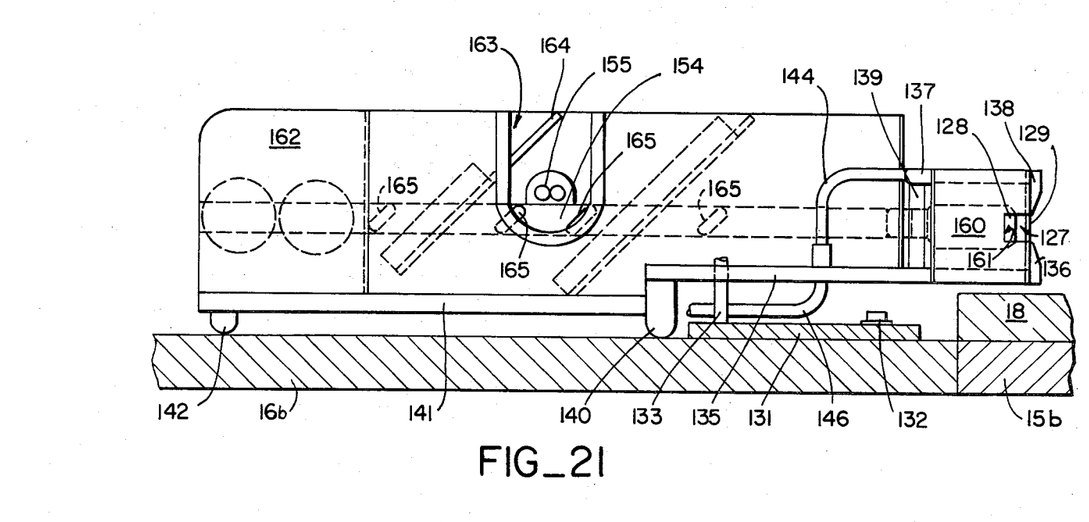
FIG. 21 is a side elevational view of the electrostatic deflection means of FIG. 19.
Figure 22:
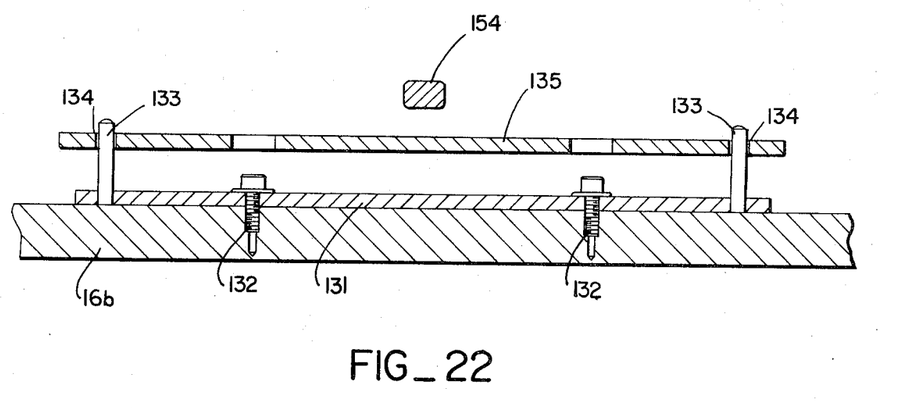
FIG. 22 is a vertical sectional view of the electrostatic deflection means taken at line 22—22 of FIG. 19.

Three shaped iron hill-pieces 18, mount on each of these plates at 120° spacing in corresponding locations to produce the azimuthally varying magnetic guide field necessary for isochronous operation. FIG. 18 illustrates one set of the shaped hill-pieces 18 on the lower plate 15b. A corresponding set bolts to plate 15a over the upper pole base 13.

A pair of hollow 120° dees 19 within the vacuum tank 17 provides an r-f accelerating field. The dee stems 20 connect via conductor means to resonator tank 21. Oscillator 22 supplies r-f energy to the dees. Vacuum means 23 evacuates the interior of vacuum tank 17 to a level in the order of about $10^{-5}$ torr.

EXTERNAL ION SOURCE AND AXIAL INJECTION SYSTEM

An external ion source assembly referred to generally as 2 in FIGS. 1 and 2 produces ions outside of the cyclotron magnetic guide field and in conjunction with an axial injection system separates a stream of negative ions and migrates them into the central region of the cyclotron. These components of the entire system are more clearly illustrated in FIGS. 3 to 12.

The external ion source assembly includes a generally U-shaped bending magnet, an evacuated region between the magnet poles and a hot-cathode Ehlers type source of ions mounted within the evacuated region between the bending magnet poles.

Figure 3:
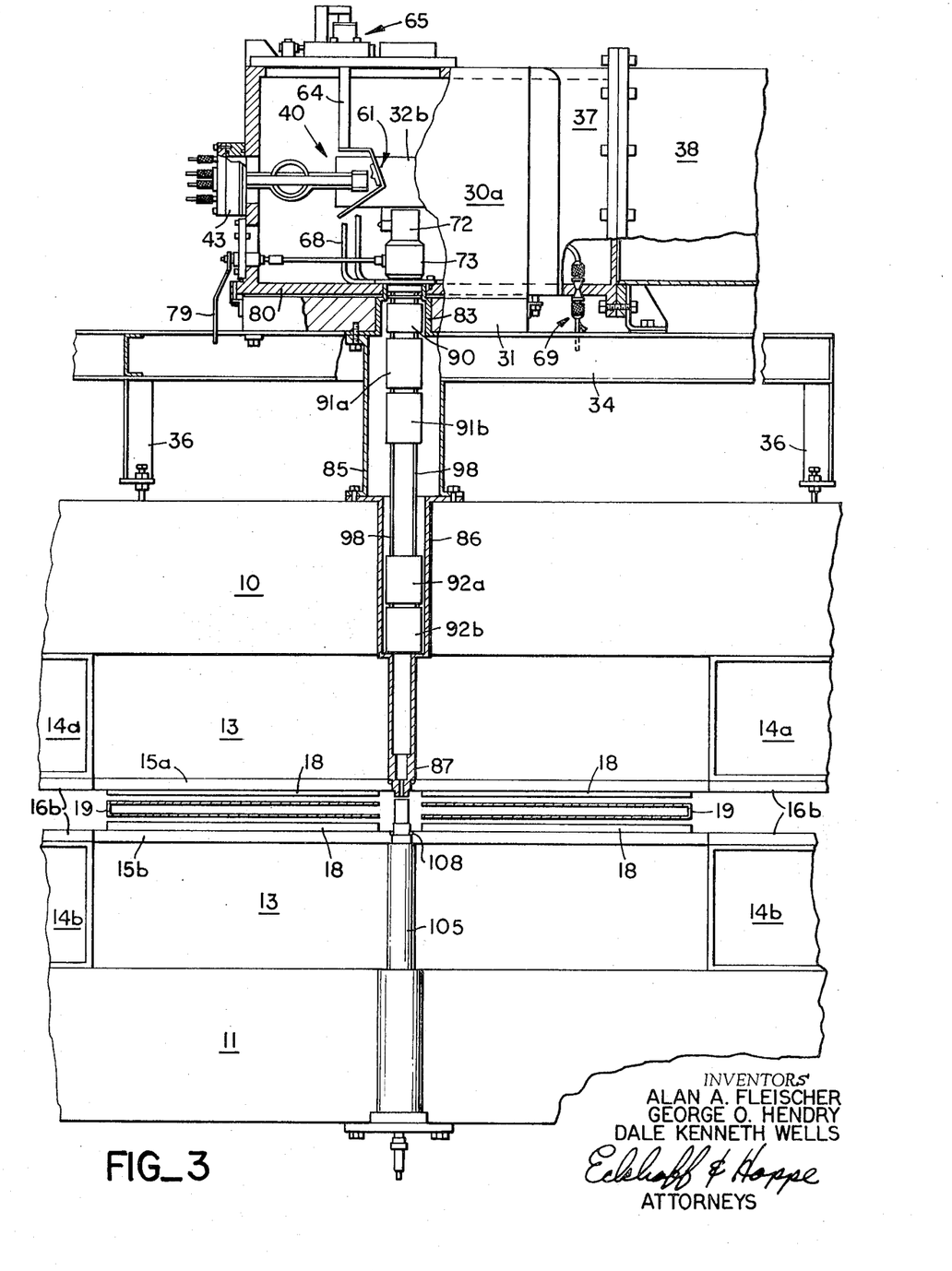
FIG. 3 is an enlarged vertical sectional view of the cyclotron of FIG. 2 taken on its center line.
Figures 4, 5:
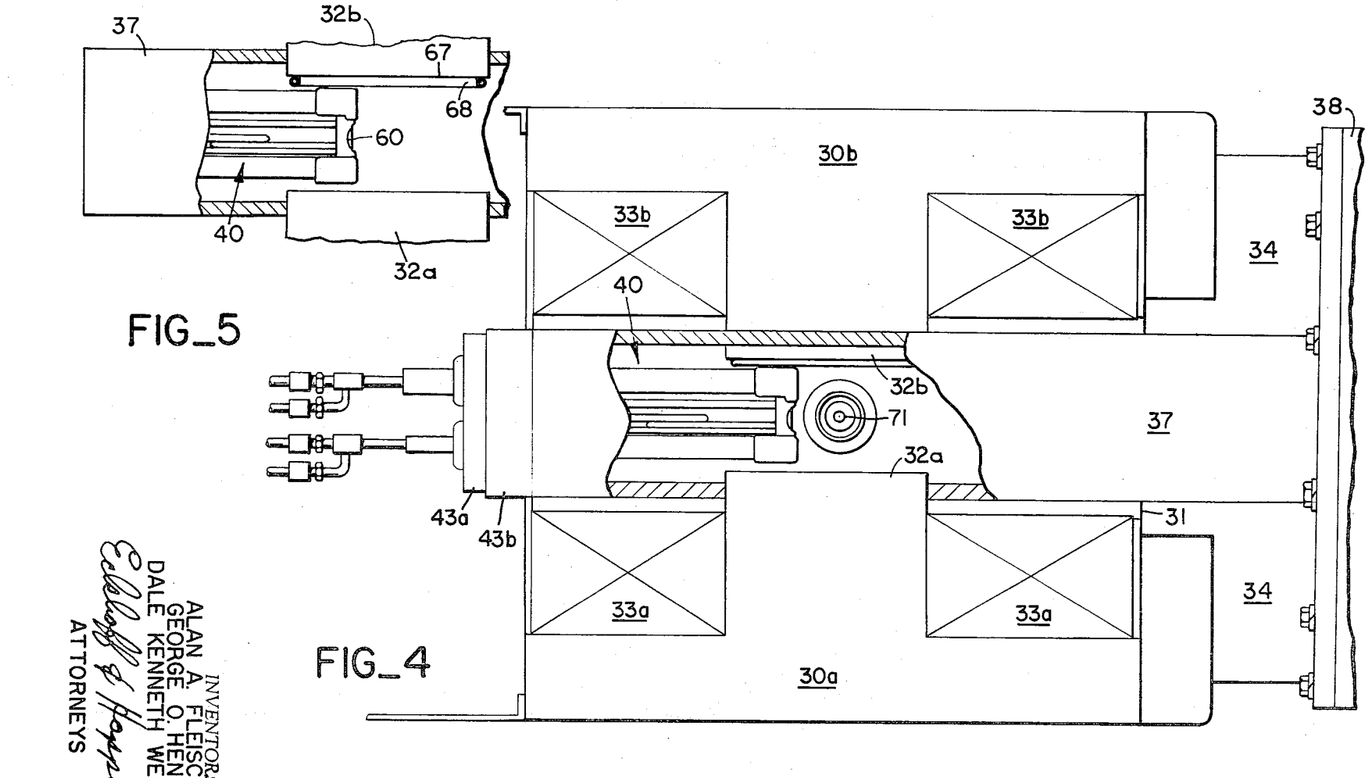
FIG. 4 is a further enlarged top view of a portion of the external ion source assembly mounted above the median plane of the cyclotron of FIG. 2 with portions broken away for clarity of illustration.
FIG. 5 is a top view of the external ion source assembly of FIG. 4 showing the relationship between the bending magnet and ion source of the assembly.
Figure 6:
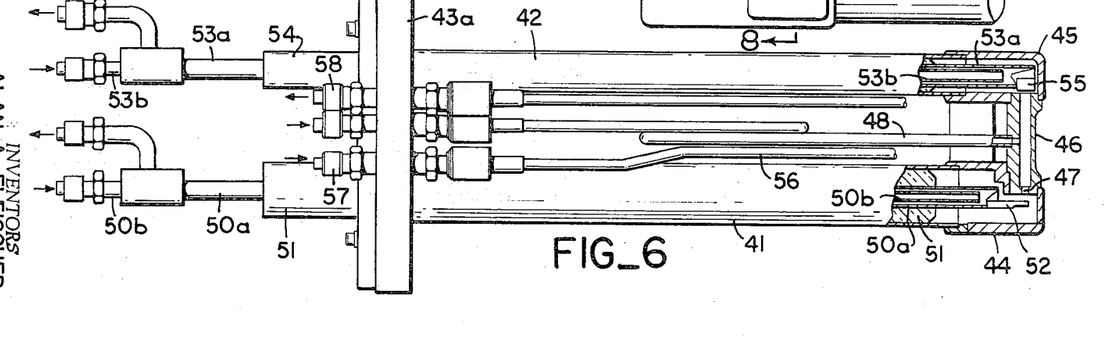
FIG. 6 is a detail top view, partly in section of the ion source for the external ion source assembly.
Figures 7, 9:
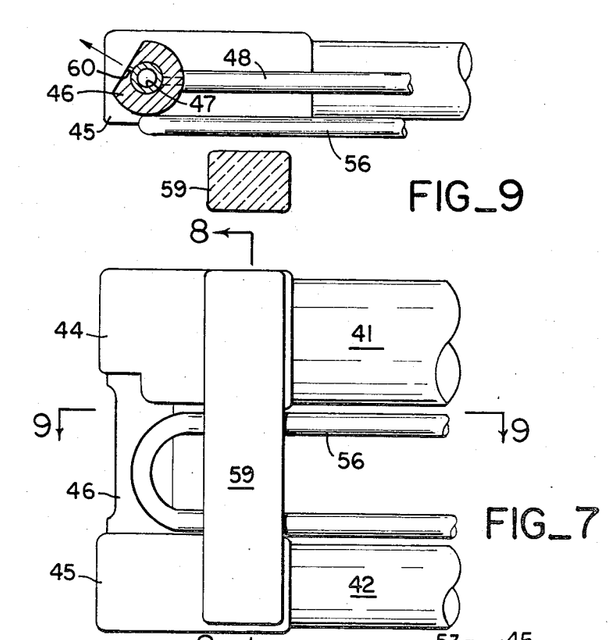
FIG. 7 is a bottom view of part of the ion source of FIG. 6.
FIG. 9 is a vertical sectional view of the ion source of FIG. 6 taken at line 9—9 of FIG. 7.

The ion source electromagnet has a pair of vertical legs 30a, 30b joined by a return yoke 31 that define a generally U-shape. Each leg carries a pole tip 32a, 32b, respectively, embraced by magnet coils 33a, 33b, respectively. The magnet iron in the embodiment illustrated in FIGS. 3 and 4 is secured to a structural steel frame 34. The frame by means of legs 36 mounts upon the top yoke slab 10 of the guide field magnet of the cyclotron as appears in FIG. 3.

An evacuated region between the bending magnet poles 32a, 32b is defined within the narrow ion source vacuum tank 37 which fits between the magnet legs 30a, 30b. Its side walls embrace and form a vacuum seal with the magnet poles which extend into the tank interior. The narrow vacuum tank 37 bolts to a tank section 38 which has a larger cross-section and terminates in vacuum pump 39. In the embodiment shown, the ion source vacuum system is separate from the cyclotron vacuum system. Vacuum pump 39 maintains a vacuum within the external ion source at the same level to which the vacuum tank 17 of cyclotron 1 is evacuated by its vacuum means 23.

Figures 10, 11, 12:
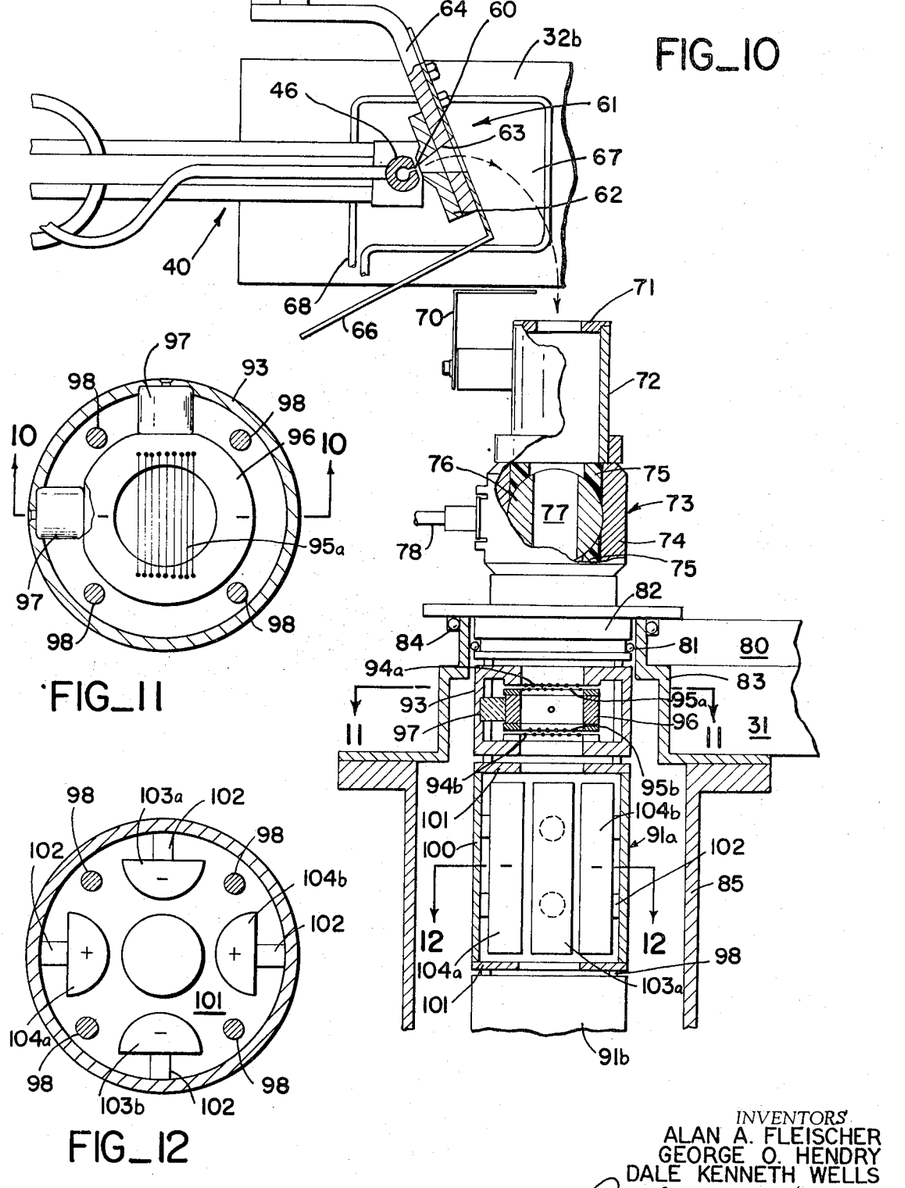
FIG. 10 is an enlarged vertical sectional view similar to FIG. 3 of a portion of the external ion source assembly and axial injection system of the cyclotron taken on the centerline of the machine.
FIG. 11 is a horizontal sectional view of the phase buncher of the axial injection system taken at line 11—11 of FIG. 10.
FIG. 12 is a horizontal sectional view of one electrostatic lens of the axial injection system taken at line 12—12 of FIG. 10.
Figure 13:
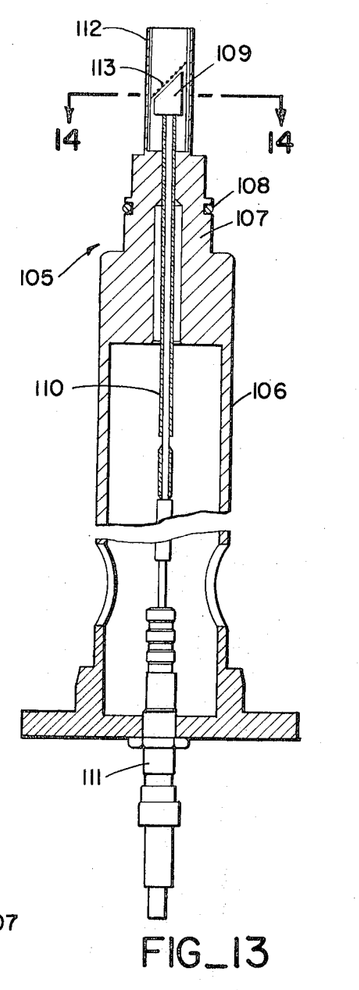
FIG. 13 is an enlarged vertical sectional view of the inflector electrode assembly for the axial injection system of the cyclotron taken on its centerline.

A hot-cathode Ehlers type source of ions, referred to generally as 40, is mounted within vacuum tank 37 between the poles 32a, 32b of the ion source bending magnet. FIGS. 3, 4 and 10 illustrate the general location of the ion source 40 which is maintained at a potential of about negative 12,000 volts. Its details more clearly appear in FIGS. 5 – 9. The source comprises a filament support tube 41 and a corresponding cathode support tube 42 both secured to a mounting flange 43a that bolts with a vacuum seal to an insulator bushing 43b bolted to the ion source vacuum tank 37. A filament housing 44 secured to the end of filament support tube 41 and a cathode housing 45 are joined by a transverse tubular arc chamber 46 having a restrictive arc defining orifice 47 at its filament end. Conduit 48 in the described embodiment supplies hydrogen gas to the center of arc chamber 46.

Figure 8:
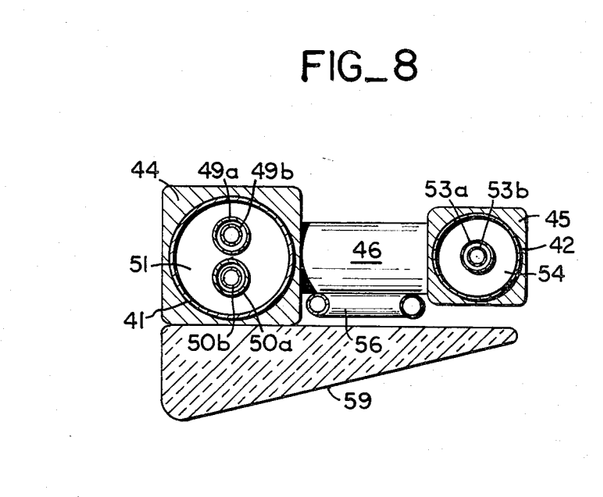
FIG. 8 is a vertical sectional view of the ion source of FIG. 6 taken at line 8—8 of FIG. 7.

As can be seen most clearly in the cross-section of FIG. 8, filament support tube 41 carries two pairs of concentric copper tubes 49a, 49b and 50a, 50b, respectively, which are electrically insulated from support tube 41 by an insulation sleeve 51. Filament 52 joins and is supported on the free ends of tubes 49a and 50a which provide filament power through their electrically conductive walls. Tubes 49b, 50b are squirt tubes which conduct cooling water to cool the filament 52. The annulus between tubes 49a, 49b and 50a, 50b provide a cooling water return.

Similarly, cathode support tube 42 carries a single pair of concentric copper tubes 53a, 53b insulated from the support tube by insulation sleeve 54. Tube 53a carries on its free end a cathode insert 55 and supplies cathode potential to it. Cooling water to the cathode flows through tube 53b and returns through the annulus between tubes 53a and 53b. Cooling tube 56 having an inlet 57 and outlet 58 on FIG. 6 cools arc chamber 46. An electron dump block 59 made from graphite mounts on the filament housing 44 as shown in FIG. 8.

The design and operation of the described ion gauge is similar to that described in the article entitled "Design Considerations For High-Intensity Negative Ion Sources" by K. W. Ehlers in *Nuclear Instruments and Methods*, Vol. 32 (1965) pages 309 – 316. Hydrogen gas from gas supply tube 48 emerges into arc chamber 46 in the region of an ion extraction slit 60 at a recess in the arc chamber tube as more clearly appears in FIGS. 6, 9 and 10. Negative hydrogen ions are produced within the arc chamber by collisions of electrons emitted from the filament with the neutral hydrogen gas molecules. As described by Ehlers, this process forms a plasma column within the arc chamber adjacent to ion extraction slit 60. A grounded puller electrode 61, depending from the top of the vacuum tank 37, as appears in FIGS. 3 and 10, extracts negative hydrogen ions from the plasma column through slit 60. The puller electrode 61 includes a carbon block 62 having a flared central slot 63 mounted upon a depending arm 64 that by adjustment means referred to generally as 65 can be manipulated to precisely locate the electrode slot with respect to extraction slit 60. The support arm 64 also carries a conductive shield 66 maintained at the puller electrode potential.

The ion source bending magnet pole 32b, which is adjacent to the small end of the electron dump block 59 on ion source 40, is faced with grounded copper electron discharge plate 67 illustrated in FIGS. 5 and 10. Cooling water circulates through tubing 68 around the periphery of the discharge plate 67 to carry off heat. Tubing 68 emerges from the ion source vacuum tank 37 through inlet and outlet connections 69 appearing on FIG. 3.

As negative ions are pulled from the ion source extraction slit 60 by puller electrode 61 they pass through its central slot 63 within a magnetic field of approximately 3,000 gauss developed by the ion source bending magnet. This magnetic field bends the path of the migrating negative ions and deflects them into a vertical beam tube assembly which enters the central region of cyclotron 1 through a hole in guide magnet top slab 10 as appears in FIG. 3. Beam monitor pick-up 70 and orifice plate 71 pass the migrating negative ions to a magnetic channel 72 mounted above a ball valve 73 by which the beam tube assembly can be opened or closed. The ball valve comprises a housing 74 and a pair of resilient spherically faced seats 75 in which a ball-shaped valve element 76 is seated. The valve element carries a central bore 77 and can be rotated 90° from the open position shown in FIG. 10 to a closed position by a remote operating assembly including rod 78 and a lever 79 operable outside of the ion source vacuum tank 37. By means of the ball valve 73, the ion source vacuum tank can be separated from the cyclotron evacuated regions.

The ball valve flanges to the bottom 80 of the ion source vacuum tank 37. A resilient sealing ring 81 bearing against the ball valve flange 82 makes a vacuum seal with sealing sleeve 83. Sealing sleeve 83 in turn is vacuum sealed by another resilient sealing ring 84 mounted in an opening in the bottom 80 of the ion source vacuum tank. The sealing sleeve also fits through a corresponding bore in the ion source magnet yoke 31 and bolts at its lower end to the axial beam tube that includes a flanged section 85 which extends between the ion source and the top yoke slab 10 of the cyclotron magnet, a second section 86 passing through a hole in the upper cyclotron magnet yoke slab and pole base 13 and upper plate 15a, and a terminating plug 87 with a small central bore communicating with the central region of the cyclotron.

Mounted within sealing sleeve 83 and axial beam tube 85, 86 are a phase buncher 90 and two pairs of quadrapole lenses 91a, 91b and 92a, 92b.

The phase buncher 90 shown generally in FIG. 3 and in detail in FIGS. 10 and 11 develops an electric field along the axial beam tube which is locked in phase with the r-f system of the cyclotron. Negative ions migrating from the ion source through the buncher are thereby velocity bunched in phase with the cyclotron r-f acceleration voltage. The buncher has a housing 93 with a central bore across each end of which are wire grids 94a, 94b. Another pair of grids 95a, 95b mount between the housing grids upon grid support ring 96 carried from the buncher housing 93 upon a pair of insulator supports 97. The phase buncher 90 as well as the pairs of quadrapole lenses all depend from ball valve flange 82 on support rods 98. Coaxial cable means connected to conductive buncher housing 93 and grids 94a, 94b on the one hand, and to grid support ring 96 and grids 95a, 95b on the other, supplies an r-f voltage across the grids in phase with that of the cyclotron r-f system at about 200 volts peak.

Supported on rods 98 immediately below the phase buncher are a first pair of electrostatic quadrapole lenses 91a, 91b. Each lens comprises a cylindrical shell 100 having a plate 101 at each end provided with a port for passage of the ion stream. Within the shell and each mounted upon insulated supports 102 are two pairs of generally cylindrical aluminum electrodes approximately hyperbolic in cross-section. The pairs of the electrodes for example 103a and 103b and 104a, 104b in FIG. 12, are maintained at opposite polarities so that the lens defines an electrostatic field within which migrating negative ions focus inwardly to the center of the lens between negative electrodes 103a, 103b and defocus toward the positive electrodes 104a, 104b. The second of each pair of electrostatic lenses is oriented at 90° with respect to the first so that the portion of the beam which is defocused in the first lens is focused by the negative electrodes in the second lens of the pair.

Thus, by the described apparatus negative ions at about 2½ milliamperes are withdrawn by puller electrode 61 and deflected by the ion source magnet into a path entering channel 72 at one end of the axial beam tube assembly. During their passage through it the migrating ions are both velocity bunched in phase with the r-f accelerating voltage of the cyclotron dees and focused by two pairs of electrostatic quadrapole lenses. The individual lenses are separately controlled for improved focusing and are maintained at a potential of about 500 volts. The stream of non-energetic negative ions which emerges from the approximately ¼ inch diameter orifice in plug 87 at the end of the beam tube in the cyclotron central region has the same period as the r-f accelerating voltage and a time average intensity of about 700 microamperes.

CYCLOTRON CENTRAL REGION

At the median plane of the cyclotron the vertical ion stream emerging through the orifice of beam tube plug 87 is deflected 90° by an electrostatic field produced with an inflector electrode assembly 105 shown generally on FIG. 3 and in detail in FIGS. 13 – 17. The inflector assembly 105 includes a support tube 106 which fits within a hole bored in the lower guide field magnet slab 11, pole base 13 and plate 15b as shown in FIG. 3. The upper end of the support tube is closed by inflector plug 107 which makes a vacuum seal with the lower plate 15b by means of resilient sealing ring 108. The support tube 106 and its plug 107 have generally the same dimensions and configuration as do the lower beam tube section 86 and its plug 87 so that the magnet metal cut away for the bores through which these elements pass is the same and correspondingly distortion of the guide magnet field is symmetrical about the median plane. A central bore in inflector plug 107 passes a ceramic sleeved copper rod 110 that supports and supplies high positive potential to an inflector electrode 109 in the order of 10,000 volts through coaxial cable connector 111. Also mounted on the inflector plug and surrounding inflector electrode 109 is a screen support tube 112 which supports slightly above the face of the inflector electrode a tungsten wire screen 113. The screen as well as screen support tube 112, inflector plug 107 and support tube 106 are all at ground potential. The inflector screen 113 is parallel to the polished face of the inflector electrode. Both slant at about 42½° from the horizontal.

Figure 14:
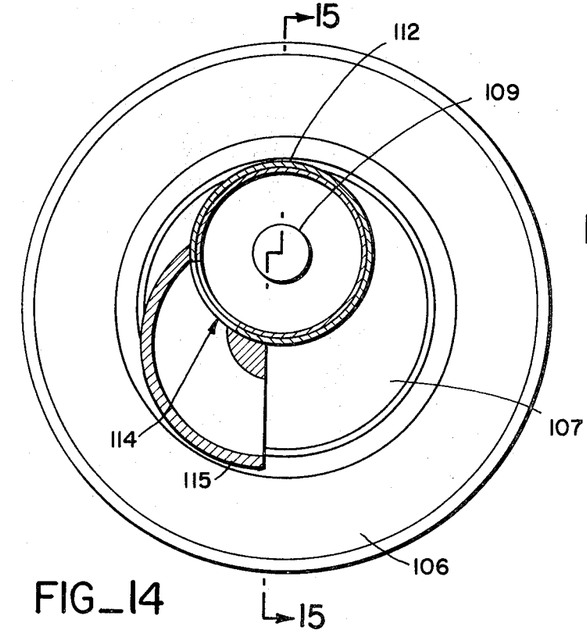
FIG. 14 is a horizontal sectional view of the inflector electrode assembly taken at line 14—14 of FIG. 13.
Figure 15:
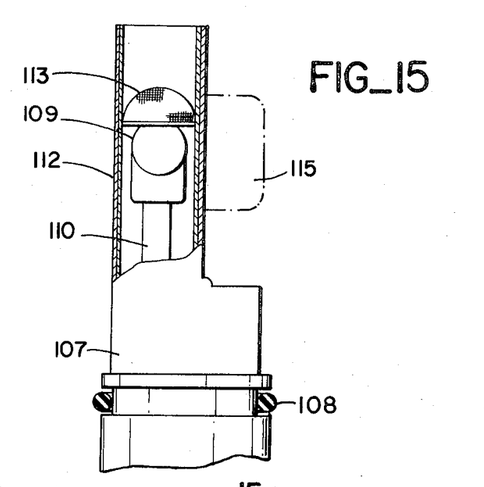
FIG. 15 is an enlarged elevational view, partly in section, of the tip of the inflector electrode assembly taken at line 15—15 of FIG. 14.
Figure 16:
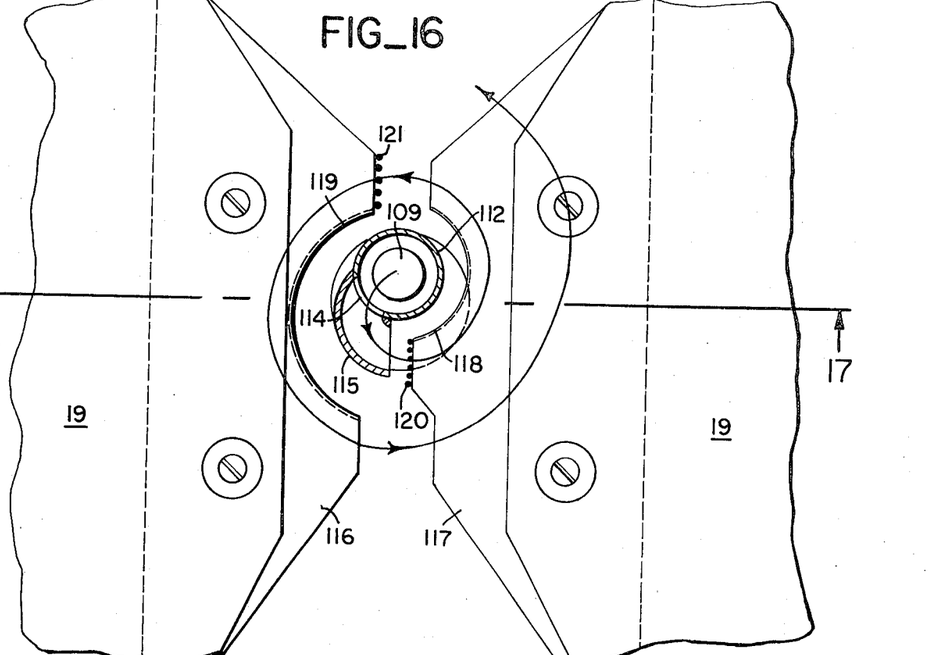
FIG. 16 is a horizontal view of the central region of the cyclotron taken just above the dees near the median plane.
Figure 17:
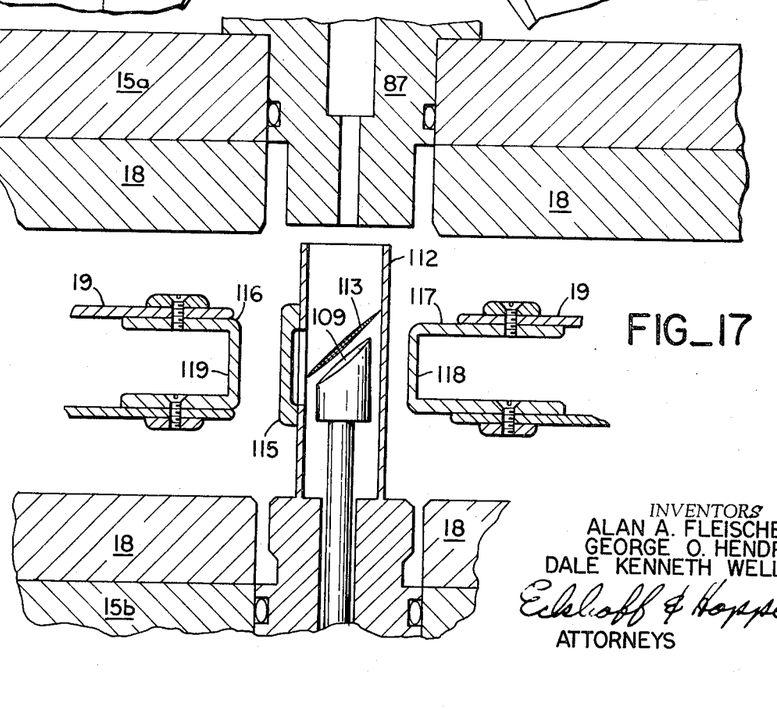
FIG. 17 is a vertical sectional view of the central region of the cyclotron taken at line 17—17 of FIG. 16.

As appears more clearly in FIGS. 14 and 16 the inflector electrode and inflector screen and its support tube are slightly eccentric with respect to cyclotron center. Screen support tube 112 has an opening 114 through which the electrostatic field developed within it deflects the migrating negative ions. Copper inflector shield 115 also at ground potential prevents distortion of the low-energy stream by the high r-f potential on the nearby dees 19.

For operation with negative hydrogen ions copper dee shields 116 and 117 having vertical curved faces 118, 119 of increasing radius prevent unwanted r-f fields from perturbing the initial orbits of the ions as shown in FIG. 16. The downwardly migrating negative ions are deflected into the horizontal median plane by the electrostatic field developed by inflector electrode 109. They pass through opening 114 in screen support tube 112 into the channel of inflector shield 115 which has an increasing radius of curvature. They then are drawn by the r-f acceleration field to the edge of dee shield 117 mounted on the right-hand dee 19. The edge of this dee shield which first receives the initially orbiting ions carries a wire grid 120 that provides vertical electric focusing of the beam as it is accelerated into the right-hand dee. A similar grid 121 on the other dee shield provides electric focusing as the ions emerging from the right-hand dee on their initial orbit are accelerated into the left hand dee.

NEGATIVE ION EXTRACTION

Negative ions started in orbit in the cyclotron central region are progressively accelerated to higher and higher energies by the r-f acceleration field applied to the cyclotron dees 19 in curvilinear paths defined by the machine's magnetic guide field. At each acceleration between dees the radius of the orbit for the ions increases so that they ultimately spiral out to an extraction radius near the boundary of the magnetic guide field. The three hill-pieces 18 provide vertical focusing of the orbiting ions. With reference to FIG. 18, an electrostatic deflection means 125 at the extraction radius deflects the negative ions from orbit and directs them in a path of increasing radius in the fringe guide field to a magnetic channel 126 which focuses the ion beam radially as is more particularly described in copending application Ser. No. 775,027 filed by George O. Hendry entitled "Cyclotron Beam Extraction System."

Electrostatic deflection means 125 is pivotable from the lower vacuum plate 16b forming part of the cyclotron vacuum tank 17 and defines an electrostatic channel 127 of increasing radius between a positively charged deflector bar 128 and a thin tungsten septum 129 at ground potential. The electrostatic field developed by the deflector bar maintained at a positive potential of about 60,000 volts deflects the orbiting negative ions at the extraction radius from orbit. Proper positioning of the pivotable deflection means directs the ions to magnetic channel 126. Negative hydrogen ion beam currents in the order of 40 microamperes have been extracted by the described method and the means illustrated in FIGS. 18 – 22.

The electrostatic deflector means mounts over the outermost edge of one of the three hill-pieces 18, between the dees 19 and upon the cyclotron vacuum tank plate 16b. The entire assembly is positioned with slotted pivot plate 131 by cap screws 132 in the slots that secure the plate to the tank at the desired orientation with respect to the extraction radius. Pivot plate 131 carries a pair of vertical dowels 133 which mate with a corresponding pair of holes 134 in the base plate 135 of the deflector assembly.

The innermost end of base plate 135 carries the curved tungsten septum 129 fastened to it by lower heat sink 136. A top plate 137 fastened to the top of the thin tungsten sheet septum 129 by upper heat sink 138 also is supported from base plate 135 by a pair of stand-off sleeves 139. The base plate fastens to a support bar 140 that bears upon the vacuum tank bottom and supports one end of insulator mounting plate 141 which at its far end also bears upon vacuum tank bottom on support feet 142. Connection 143 supplies cooling water to conduits, not shown, which are defined within the base plate along heat sink 136 and then through conduit 144 to conduits defined in the top plate along heat sink 138 and then through return conduit 145 to cooling water return connection 146.

At the other end of the insulator support plate is a pair of brackets 150 each of which carries a pair of sleeve insulator supports 151 that support one end of ceramic rods 152. The other ends of each of these ceramic rods fit into tubular support sleeves 153. Cantilevered from the support sleeves 153 upon a conductive electrode support 154 is the copper high voltage positive deflector bar 128. A water cooled high voltage lead 155 electrically connects the electrode support 154 and supplies the high positive potential to the deflector bar 128.

The tungsten septum is maintained at ground potential and a system of electrostatic shielding also at ground establishes a uniform falling electrostatic gradient from the high positive voltage components of the deflector assembly to the shielding. This avoids potential wells in positive electrostatic fields in the vicinity of the deflector assembly and eliminates the collection of extraneous electrons in them. The shielding also isolates the highly positively charged deflection components from extraneous electrons present within the vacuum tank. For this purpose the ends of the top and base plates 138, 135, respectively, are shielded by conductive end shields 160 provided with cutout portions 161 for admission of the negative ion beam to the electrostatic channel for extraction. The electrode support 154 is shielded on each side by grounded conductive shields 162, each extending from the top plate at the inner end, then along the sides of the electrode support bar, and terminating adjacent support brackets 150 at their outermost ends. The right hand shield of FIG. 19 has a cutout portion 163 through which passes high voltage lead 155. The right hand electrostatic shield 162 carries a pair of canted fins 164 extending inwardly to carry inwardly the ground plane between spaced and canted electron dumps 165 mounted on the right hand side of the electrode support. The tortuous path developed by these dumps in combination with the inwardly extending ground plane cause collection on the dumps of electrons which are attracted to the highly positively charged components. This prevents a flow of extraneous electrons from striking and thereby destroying the supporting ceramic rods 152 for the deflector bar 128.

An extracted beam of negative hydrogen ions in the order of 10 to 20 microamperes has been obtained by the described method and apparatus with a quality sufficient for direct injection into a model FN tandem Van de Graaff accelerator.

It will be apparent to those skilled in this art that various modifications may be made and equivalents substituted for the specific mechanical components described herein for the system which are within the scope of the invention defined by the appended claims.

We claim:

1. A method for producing a beam of high energy positive ions comprising the steps of
   forming a magnetic guide field;
   defining an evacuated accleration region having a median plane within and perpendicular to said magnetic guide field;
   producing within said evacuated acceleration region a periodic radio frequency electric field with which, in combination with said magnetic guide field, to accelerate ions in said median plane in orbits increasing in radius from the center of said evacuated region to an extraction radius;
   producing a plurality of randomly charged ions outside of said guide field;
   separating negative ions from the others of said randomly charged ions and migrating them in a direction parallel to said guide field to the center of said evacuated region;
   velocity bunching the migrating negative ions in phase relationship to said radio frequency electric field;
   deflecting the migrating and velocity bunched negative ions into the median plane at the center of said evacuated region;
   accelerating said negative ions from said center to said extraction radius;
   electrostatically deflecting accelerated negative ions from orbit at said extraction radius in a linear beam at a first energy level;
   then linearly accelerating the negative ions in said beam to a higher second energy level;
   stripping the negative charge from the energetic negative ions to produce positive ions;
   and then linearly accelerating said positive ions to a still higher third energy level.

2. The method of claim 1 wherein the step of velocity bunching the migrating ions includes applying a periodic radio frequency field to said migrating negative ions outside of the magnetic guide field which is locked in phase with the periodic radio frequency electric field produced within the evacuated accleration region.

3. The method of claim 1 wherein the step of deflecting the migrating negative ions into the median plane includes exposing said migrating ions at their incidence upon said median plane to a plane positive electrostatic deflection field inclined 42½° with respect to said median plane.

4. The method of claim 3 wherein the migrating negative ions are sequentially focused in a beam prior to deflection by a plurality of separately controlled electrostatic focusing fields.

5. The method of claim 1 wherein the step of electrostatically deflecting accelerated negative ions from orbit includes defining a positive electrostatic deflection field of increasing radius at said extraction radius, and intercepting said accelerated negative ions with said positive electrostatic deflection field.

6. In a method for producing a beam of high energy positive ions by linearly accelerating a beam of energetic negative ions at a first energy level to a higher second energy level, stripping the negative charge from the negative ions to produce positive ions, and then linearly accelerating the positive ions to a still higher third energy level, the improvement of supplying said beam of energetic negative ions at said first energy level by the steps of
   forming a magnetic guide field;
   defining an evacuated acceleration region having a median plane within and perpendicular to said magnetic guide field;
   producing within said evacuated acceleration region a periodic radio frequency electric field with which, in combination with said magnetic guide field, to accelerate ions on said median plane in orbits increasing in radius from the center of said evacuated region to an extraction radius;
   producing a plurality of randomly charged ions outside of said guide field;
   separating negative ions from the others of said randomly charged ions and migrating them in a direction parallel to said guide field to the center of said evacuated region;
   velocity bunching the migrating negative ions in phase relationship to said radio frequency electric field;
   deflecting the migrating and velocity bunched negative ions at the center of said evacuated region into the median plane of said orbits;
   accelerating said negative ions from said center to said extraction radius; and
   electrostatically deflecting accelerated negative ions from orbit at said extraction radius in a linear beam at said first energy level.

7. The method of claim 6 wherein the step of velocity bunching the migrating ions includes applying a periodic radio frequency field to said migrating negative ions outside of the magnetic guide field which is locked in phase with the periodic radio frequency electric field produced within the evacuated acceleration region.

8. The method of claim 6 wherein the step of deflecting the migrating negative ions into the median plane includes exposing said migrating ions at their incidence upon said median plane to a plane positive electrostatic deflection field inclined 42½° with respect to said median plane.

9. The method of claim 8 wherein the migrating negative ions are sequentially focused in a beam prior to deflection by a plurality of separately controlled electrostatic focusing fields.

10. The method of claim 6 wherein the step of electrostatically deflecting accelerated negative ions from orbit includes defining a positive electrostatic deflection field of increasing radius at said extraction radius and intercepting said accelerated negative ions with said positive electrostatic deflection field.

11. Apparatus for producing a beam of high energy positive ions including
    means defining a magnetic guide field;
    means defining an evacuated acceleration region having a median plane within and perpendicular to said magnetic guide field;
    acceleration means producing within said evacuated acceleration region a periodic radio frequency electric field with which, in combination with said magnetic guide field, to accelerate ions on said median plane in orbits increasing in radius from the center of said evacuated region to an extraction radius;
    an ion source producing a plurality of randomly charged ions outside of said guide field;
    means separating negative ions from the others of said randomly charged ions and migrating them in a direction parallel to said guide field to the center of said evacuated region;

means velocity bunching negative ions migrating from said ion source in phase relationship to said radio frequency electric field;

means deflecting the migrating and velocity bunched negative ions into the median plane of said orbits at the center of said evacuated region;

electrostatic means deflecting accelerated negative ions from orbit at said extraction radius in linear liner beam at a first energy level; and an electrostatic linear accelerator accelerating the negative ions in said beam to a higher second energy level, stripping the negative charge from said negative ions to produce positive ions, and then accelerating said positive ions to a still higher third energy level.

12. The apparatus of claim 11 wherein the means velocity bunching the migrating negative ions includes a pair of grids spaced along the path of said ions outside the magnetic guide field, and means applying a periodic radio frequency field to said grids which is locked in phase with the periodic radio frequency electric field within the evacuated acceleration region.

13. The apparatus of claim 11 wherein the means deflecting the migrating ions into the median plane comprise a highly positively charged inflector electrode having a plane face at said median plane and inclined 42½° with respect to said median plane;

a grounded mesh plane parallel to said electrode face and spaced from it toward the incident migrating ions.

14. The apparatus of claim 13 wherein a series of separately controlled electrostatic lenses focuses the migrating ions in a beam incident upon the inclined inflection field defined between said inflector electrode face and said grounded mesh plane.

15. The apparatus of claim 11 wherein the means deflecting accelerated negative ions from orbit comprises means defining an electrostatic channel of increasing radius which intercepts said accelerated negative ions at the extraction radius, including a grounded septum and a positively charged deflector bar spaced from it and producing a positive steady electric field across said channel;

support means for said deflector bar;

means insulating said support means from ground potential;

grounded shielding means for defining uniformly falling electric fields from and in the vicinity of said deflector bar support means and insulating means and for isolating them from extraneous electrons within the evacuated acceleration region; and electron dumps protruding from said support means for collecting and discharging extraneous electrons that are attracted to said deflector bar and support means.

* * * * *